United States Patent
Sato

(10) Patent No.: US 9,569,715 B2
(45) Date of Patent: Feb. 14, 2017

(54) WIRELESS TAG, AND COMMUNICATION DEVICE, SYSTEM AND METHOD

(75) Inventor: Tadashi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 12/669,987

(22) PCT Filed: Jul. 24, 2008

(86) PCT No.: PCT/JP2008/063273
§ 371 (c)(1),
(2), (4) Date: Jan. 21, 2010

(87) PCT Pub. No.: WO2009/014173
PCT Pub. Date: Jan. 29, 2009

(65) Prior Publication Data
US 2010/0194531 A1    Aug. 5, 2010

(30) Foreign Application Priority Data

Jul. 26, 2007  (JP) ................................ 2007-194454

(51) Int. Cl.
*G06F 7/00*     (2006.01)
*G06K 19/07*    (2006.01)
*H04M 1/725*    (2006.01)

(52) U.S. Cl.
CPC ....... *G06K 19/0723* (2013.01); *G06K 19/0719* (2013.01); *H04M 1/7253* (2013.01)

(58) Field of Classification Search
CPC ............ G06K 19/0719; G06K 23/0723; G06K 19/0723; H04M 1/7253; G06F 19/323; G06Q 20/341

USPC ......................................................... 340/5.83
See application file for complete search history.

(56) References Cited

U.S. PATENT DOCUMENTS

| | | | | |
|---|---|---|---|---|
| 4,353,064 A | * | 10/1982 | Stamm ............... | G07C 9/00119 235/380 |
| 7,107,009 B2 | * | 9/2006 | Sairanen ............... | G06F 3/0481 340/572.1 |
| 7,269,737 B2 | * | 9/2007 | Robinson ............... | G06Q 20/04 340/5.82 |
| 7,832,646 B1 | * | 11/2010 | Leason ................ | G06Q 20/102 235/492 |
| 2004/0233039 A1 | * | 11/2004 | Beenau .................. | G06Q 20/00 340/5.83 |

(Continued)

FOREIGN PATENT DOCUMENTS

| | | |
|---|---|---|
| JP | 11-195102 A | 7/1999 |
| JP | 2000172818 A | 6/2000 |

(Continued)

OTHER PUBLICATIONS

International Search Report for PCT/JP2008/063273 mailed Oct. 28, 2008.
Chinese Office Action for CN20088010555.6 dated Oct. 30, 2012.

*Primary Examiner* — Naomi Small

(57) ABSTRACT

A wireless tag (1) includes: an antenna (14) that receives an access signal transmitted from a reader/writer; a decoding unit (15) that decodes the access signal received by the antenna; a detecting unit (12) that detects input of a signal corresponding to a user operation; and a control unit (13) that performs processing corresponding to a combination of a result of detection of the detecting unit and a result of decoding of the decoding unit, the results being obtained in parallel.

2 Claims, 22 Drawing Sheets

(56) References Cited

U.S. PATENT DOCUMENTS

| | | | |
|---|---|---|---|
| 2005/0001711 A1* | 1/2005 | Doughty | G06Q 20/327 340/5.74 |
| 2005/0194452 A1* | 9/2005 | Nordentoft | G06Q 20/341 235/492 |
| 2006/0049258 A1* | 3/2006 | Piikivi | G05B 19/00 235/451 |
| 2006/0164246 A1* | 7/2006 | Ghosh | G06K 17/00 340/572.1 |
| 2007/0176741 A1* | 8/2007 | Montenegro | H04L 63/107 340/5.83 |
| 2007/0257100 A1* | 11/2007 | Chase-Salerno | G06Q 20/341 235/380 |
| 2008/0169909 A1* | 7/2008 | Park | G06F 21/35 340/10.4 |
| 2009/0078777 A1* | 3/2009 | Granucci | G06Q 20/105 235/492 |

FOREIGN PATENT DOCUMENTS

| | | |
|---|---|---|
| JP | 2001117707 A | 4/2001 |
| JP | 2004086870 A | 3/2004 |
| JP | 2005057539 A | 3/2005 |
| JP | 2005117124 A | 4/2005 |
| JP | 2006134086 A | 5/2006 |
| JP | 2007006029 A | 1/2007 |
| WO | 2006104354 A1 | 10/2006 |

\* cited by examiner

FIG.8
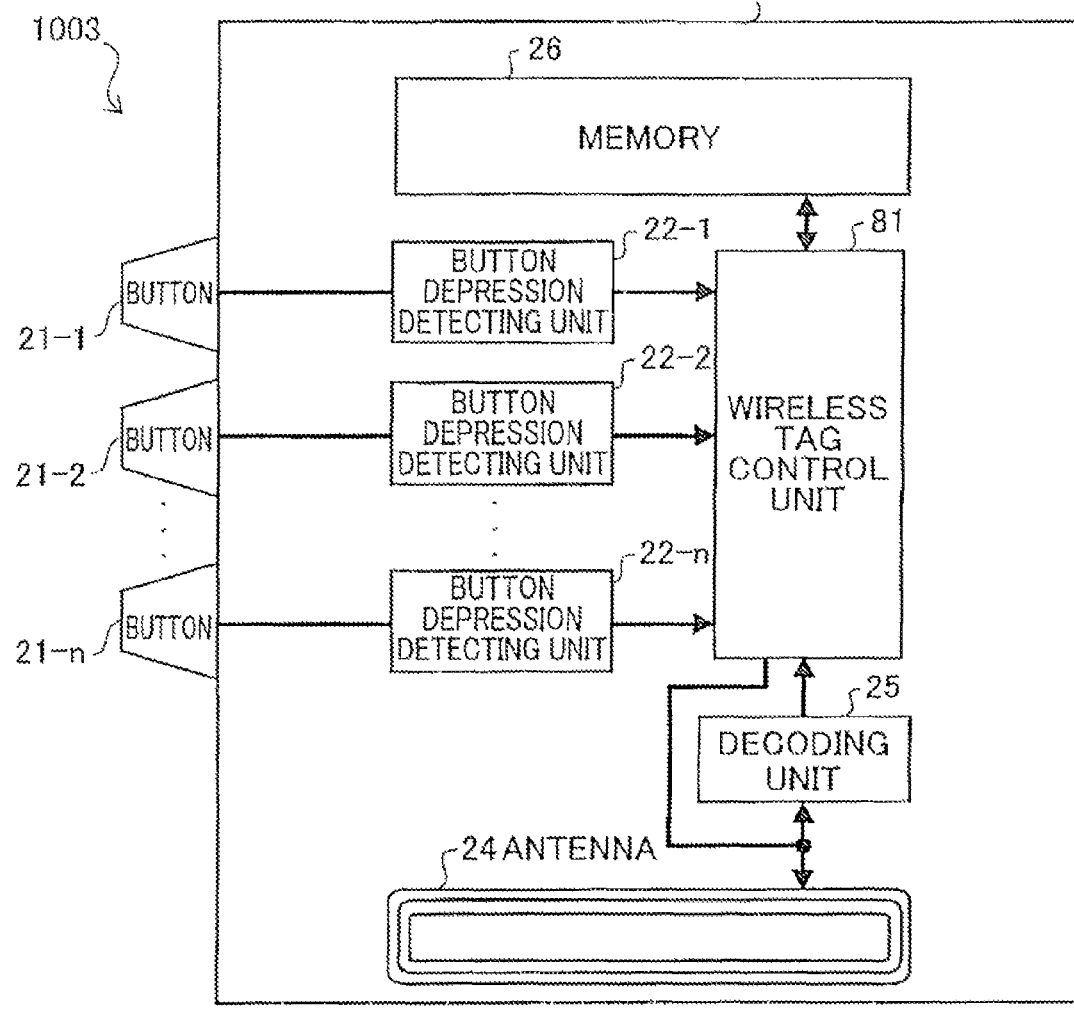
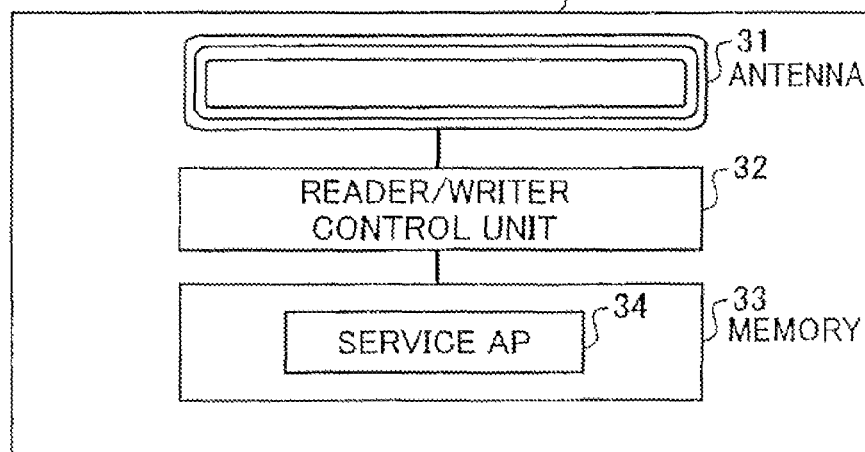

FIG.15

263 FUNCTION FLAG CORRESPONDENCE TABLE

| SERVICE TYPE | FUNCTION | FLAG |
|---|---|---|
| SHOP "A" ACCOUNTS | NOTIFICATION OF SHOP "A" COUPON | SERVICE USE FLAG 162-1-1 |
| SHOP "A" ACCOUNTS | SENDING STATEMENT BY E-MAIL | SERVICE USE FLAG 162-1-m |
| SHOP "A" ACCOUNTS | FUNCTION 162-1-n | SERVICE USE FLAG 162-1-n |
| MOBILE TICKET | FUNCTION 162-2-1 | SERVICE USE FLAG 162-2-1 |
| MOBILE TICKET | ROUTE SEARCH | SERVICE USE FLAG 162-2-j |
| MOBILE TICKET | FUNCTION 162-2-k | SERVICE USE FLAG 162-2-k |

FIG.17

262 KEY FUNCTION TABLE

|  | NO KEY DEPRESSION | KEY 1 DEPRESSED | KEY 2 DEPRESSED | KEY 3 DEPRESSED |
|---|---|---|---|---|
| SHOP "A" ACCOUNTS | PAYMENT ONLY | SENDING PAYMENT STATEMENT BY E-MAIL | — | — |
| | BILLING ONLY | ROUTE SEARCH | — | — |
| MOBILE TICKET | | | ARRIVAL TIME ALARM | GUIDANCE OF RECOMMENDATION SPOT |

WIRELESS TAG, AND COMMUNICATION DEVICE, SYSTEM AND METHOD

This application is the National Phase of PCT/JP2008/063273, filed Jul. 24, 2008, which is based upon and claims the benefit of priority from prior Japanese Patent Application No. 2007-194454, filed Jul. 26, 2007, the entire contents of which are incorporated herein by reference.

TECHNICAL FIELD

The present invention relates to a wireless tag that uses an RFID (Radio Frequency Identification) technology.

BACKGROUND ART

Wireless tags using RFID technologies are prevalent in various fields, such as a payment service of making a payment for goods by holding a wireless tag over a reader, and an information provision service of providing information pertaining to the location of a reader by holding a wireless tag over the reader.

For example, PTL 1 describes a technology using a wireless tag. The wireless tag described in PTL 1 includes a switch for turning on/off wireless communications with a detection apparatus. The wireless tag is installed in a door of a building. The detection apparatus drives a call bell in the interior of a room when the apparatus detects a radio wave signal that is transmitted from the wireless tag upon depression of the switch by a visitor.

CITATION LIST

Patent Literature

{PTL 1} JP-A-2005-117124

SUMMARY OF INVENTION

Technical Problem

According to the technology described in the foregoing PTL 1, the switch on the wireless tag can be used as a remote button of the call bell. Since the technology in the literature is limited to the control of simply ringing the call bell upon the depression of the switch on the wireless tag, the wireless tag lacks versatility for various kinds of applications and services.

It is thus an object of the present invention to provide a technology that allows the user to selectively use services that use a wireless tag.

Solution to Problem

A wireless tag according to the present invention includes: an antenna that receives an access signal transmitted from a reader/writer; a decoding unit that decodes the access signal received by the antenna; a detecting unit that detects input of a signal corresponding to a user operation; and a control unit that performs processing corresponding to a combination of a result of detection of the detecting unit and a result of decoding of the decoding unit, the results being obtained in parallel.

A communication apparatus according to the present invention includes: the foregoing wireless tag; and a key unit that supplies a signal corresponding to a user operation to the detecting unit.

A system according to the present invention includes: the foregoing wireless tag or communication apparatus; and a reader/writer that transmits the access signal. The reader/writer includes a control unit that transmits, as the access signal, a signal for requesting the wireless tag to register correspondence between user operations on the plurality of input devices and additional service functions for the user. The control unit of the wireless tag records the correspondence indicated by the access signal from the reader/writer into a memory.

A method according to the present invention includes: receiving an access signal transmitted from a reader/writer of a wireless tag; decoding the access signal received; detecting input of a signal corresponding to a user operation; and performing processing corresponding to a combination of a result of the detecting and a result of the decoding, the results being obtained in parallel.

Advantageous Effects of Invention

According to the present invention, the user can selectively use services that use the wireless tag.

BRIEF DESCRIPTION OF DRAWINGS

FIG. 8 is a block diagram of a third concrete example of the first embodiment.

FIG. 15 is an explanatory diagram of a function flag correspondence table according to the third embodiment.

FIG. 17 is an explanatory diagram of a key function table according to the third embodiment.

REFERENCE SIGNS LIST

1: wireless tag, 11: input unit, 12: detecting unit, 13: wireless tag control unit, 14: antenna, 15: decoding unit

DESCRIPTION OF EMBODIMENTS

First Embodiment

Figure 1:
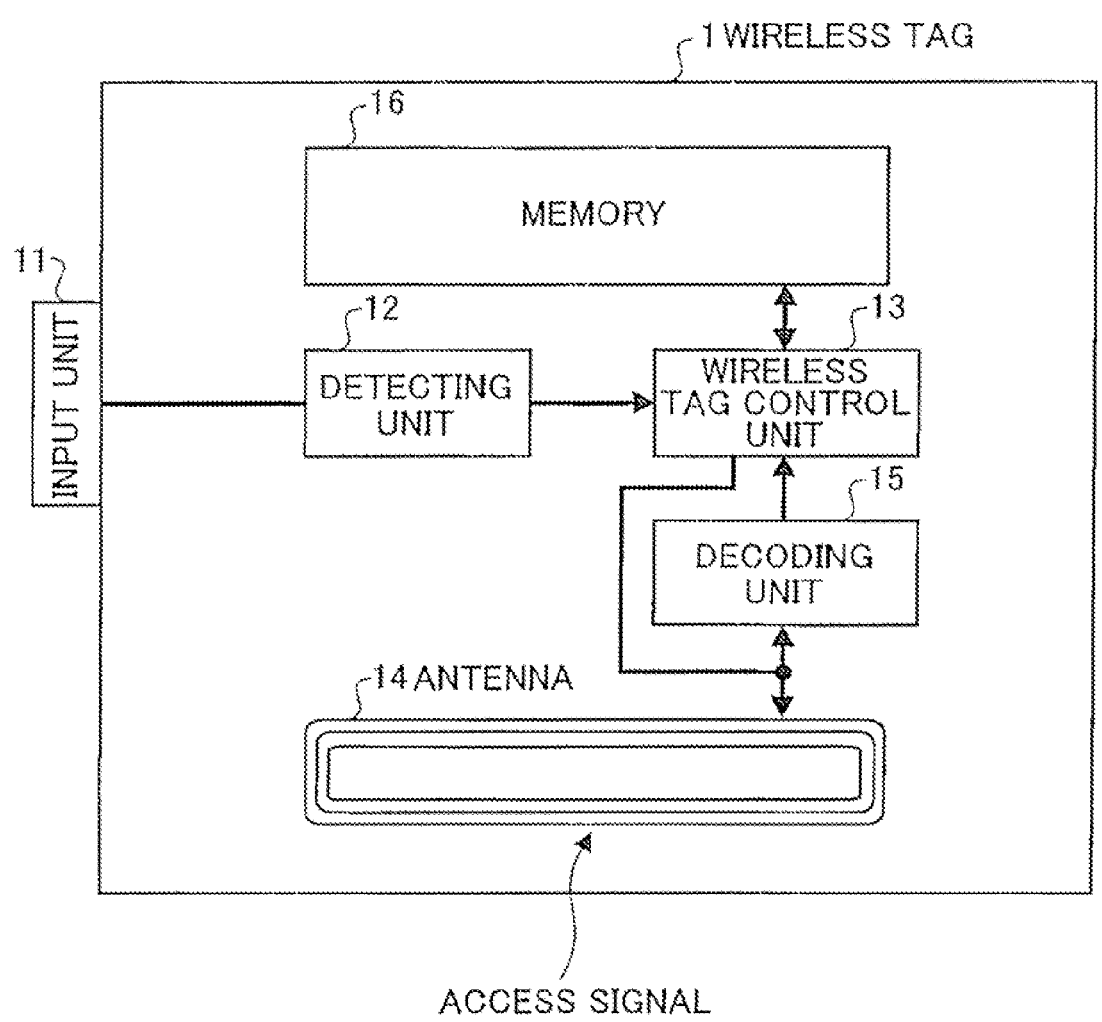
FIG. 1 is a block diagram showing an example of configuration of a first embodiment according to the present invention.

FIG. 1 is a block diagram of a first embodiment of the wireless tag according to the present invention. The wireless tag 1 is a wireless communication medium using RFID technologies, and includes an input unit 11, a detecting unit 12, a wireless tag control unit 13, an antenna 14, a decoding unit 15, and a memory 16.

The input unit 11 inputs a signal corresponding to a user operation into the detecting unit 12. For example, the input unit 11 can be implemented by a button, a key, a touch sensor, or the like. The detecting unit 12 detects the signal input by the input unit 11. The antenna 14 transmits and receives wireless signals to/from a reader/writer (not shown). The decoding unit 15 decodes a reader/writer's access signal received by the antenna 14.

The wireless tag control unit 13 is implemented by a control device such as a CPU, and performs processing corresponding to a combination of the result of detection of the detecting unit 12 and the result of decoding of the decoding unit 15. The memory 16 contains a program and data for causing the CPU function as the wireless tag control unit 13.

Figure 2:
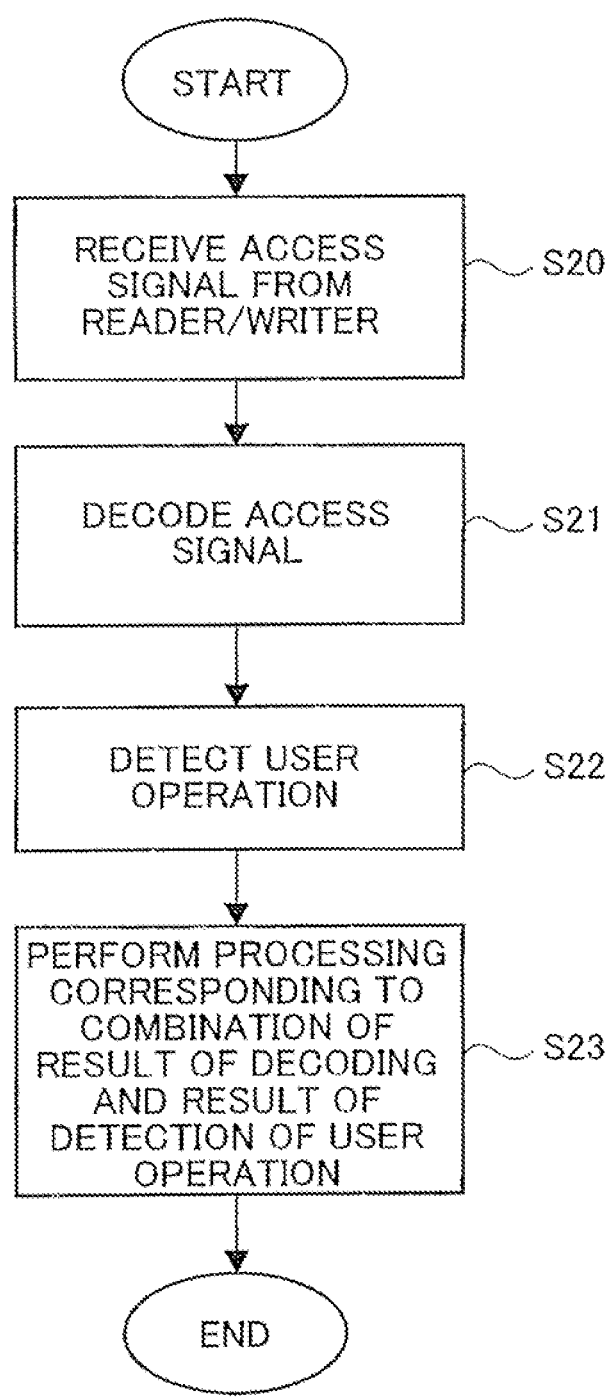
FIG. 2 is a flowchart showing an example of operation of the first embodiment.

The basic operation of the wireless tag 1 will be described with reference to the flowchart shown in FIG. 2. When a user holds the wireless tag 1 over the reader/writer, the antenna 14 receives the access signal from the reader/writer (step S20). The decoding unit 15 decodes the access signal (step S21). In the meantime, the detecting unit 12 detects what user operation is being made on the input unit 11 (step S22). For example, if the input unit 11 is a button, the detecting unit 12 detects whether the button is being depressed or not. If the input unit 11 is a touch sensor, the detecting unit 12 detects which part of the panel is being touched.

The wireless tag 1 performs processing corresponding to the combination of the result of decoding and the result of detection of the user operation that are obtained in parallel (step S23). Consequently, even if the result of decoding is the same, the wireless tag 1 can perform different types of processing for respective different results of detection.

According to the present embodiment, it is possible to make the wireless tag 1 perform a plurality of types of processing selectively in response to a single type of access signal which is transmitted from the reader/writer.

Concrete Example 1

Figure 3:
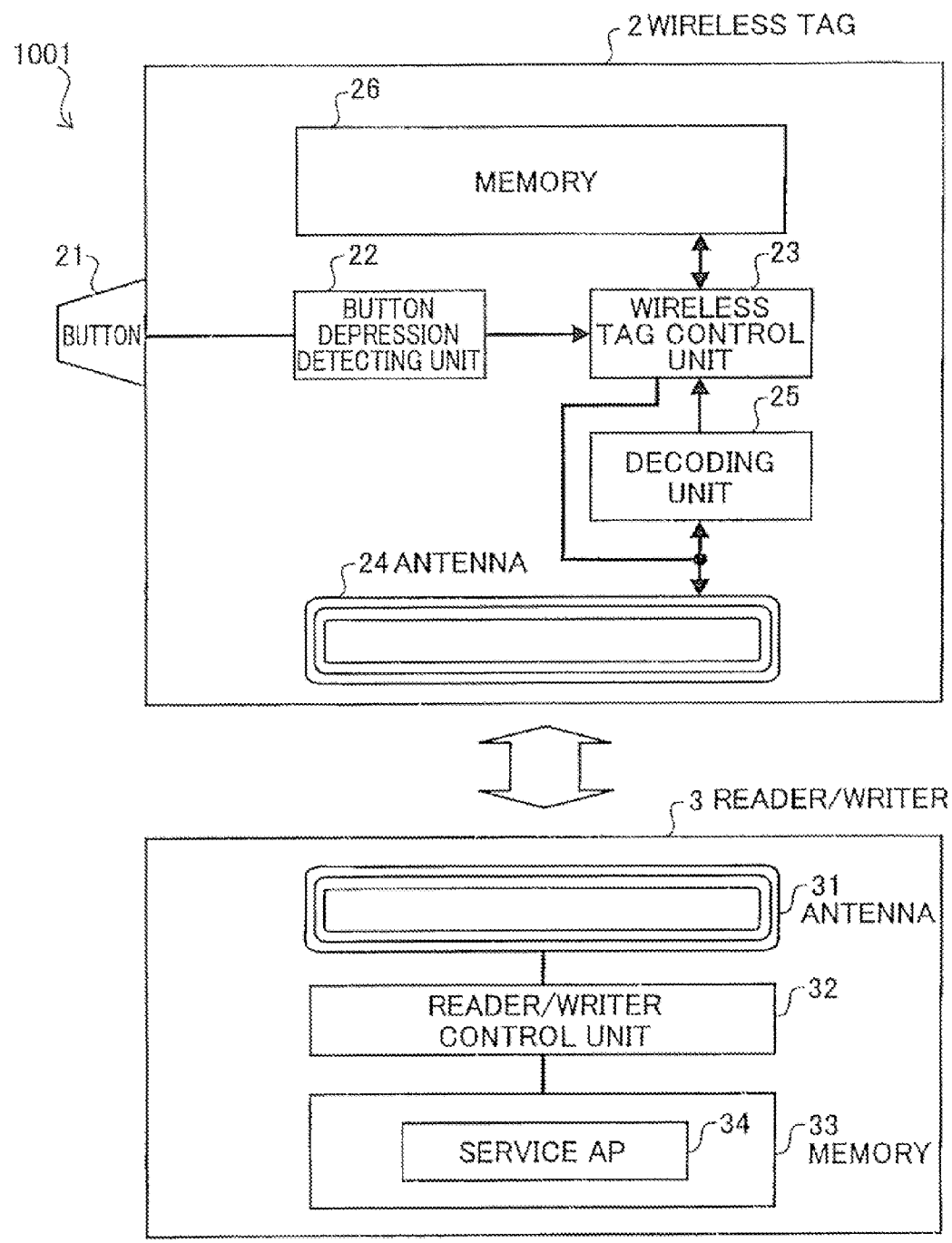
FIG. 3 is a block diagram of a first concrete example of the first embodiment.

FIG. 3 shows the configuration of a first concrete example according to the embodiment of FIG. 1. A system 1001 of the concrete example includes a wireless tag 2 and a reader/writer 3.

The wireless tag 2 includes a button 21, a button depression detecting unit 22, a wireless tag control unit 23, an antenna 24, a decoding unit 25, and a memory 26. Of these, the antenna 24, the decoding unit 25, and the memory 26 are the same as those of the foregoing embodiment (FIG. 1).

The button 21 corresponds to the foregoing input unit (11). When depressed by a user operation, a signal that indicates of the depression is input. The button depression detecting unit 22 corresponds to the foregoing detecting unit (12). The button depression detecting unit 22 has the function of detecting whether the button 21 is being depressed or not.

The wireless tag control unit 23 creates a response message according to the combination of the result of detection of the button depression detecting unit 22 and the result of decoding of the decoding unit 25. The wireless tag control unit 23 has the function of encoding the created response message and sending back the resultant to the reader/writer 3. The response message created by the wireless tag control unit 23 is associated with the activation of a service AP 34 of the reader/writer 3 to be described later. In other words, which service AP 34 for the reader/writer 3 to activate depends on the response message from the wireless tag 2.

The reader/writer 3 includes an antenna 31, a reader/writer control unit 32, and a memory 33. The memory 33 stores application programs (service APs) 34 and data for providing services to the user of the wireless tag 2. The service APs 34 are not limited to programs for executing certain applications, but may be sets of a plurality of application programs. The reader/writer control unit 32 has the function of generating an access signal to be transmitted to the wireless tag 2, and the function of activating the service APs 34.

Figure 4:
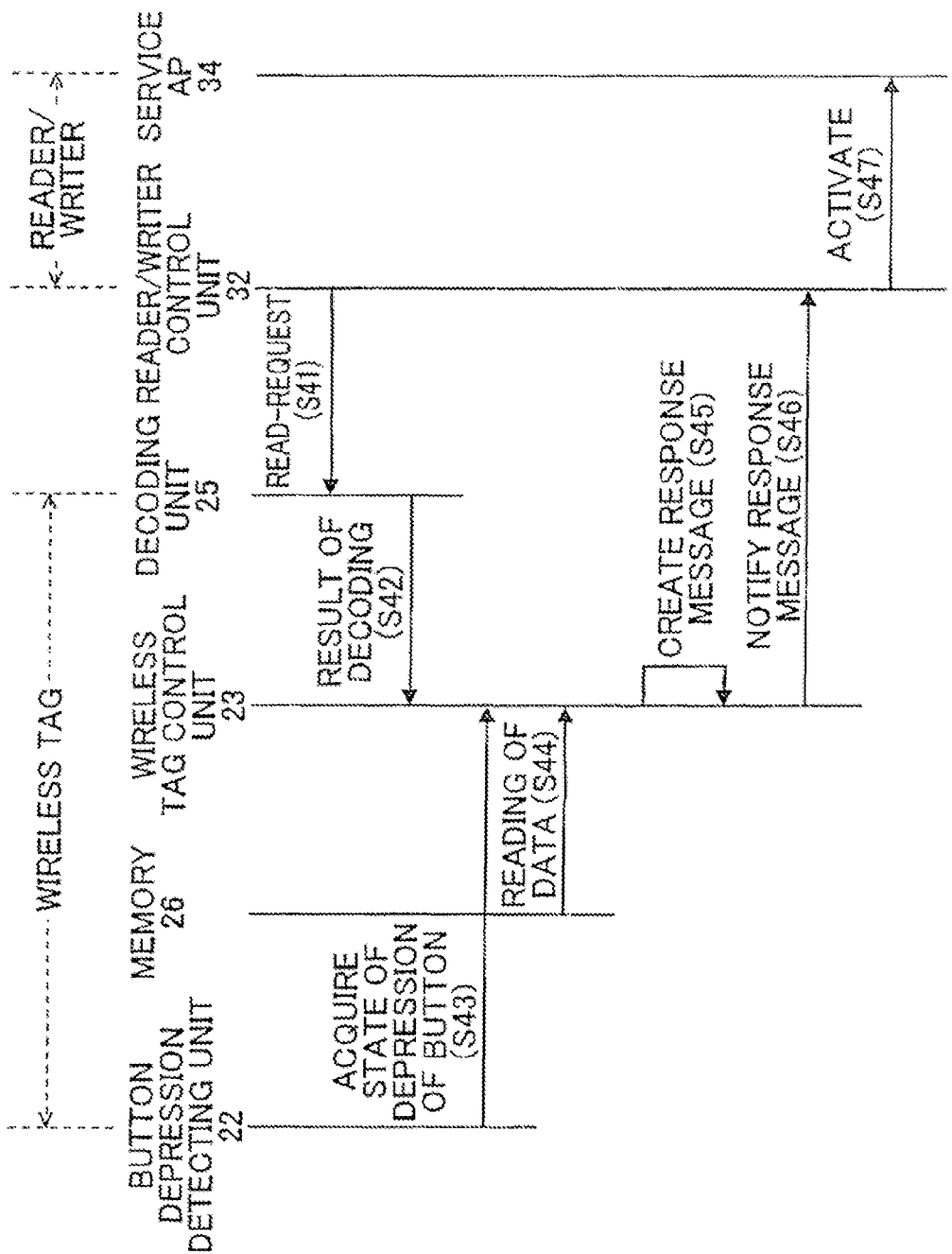
FIG. 4 is a sequence diagram of the first concrete example.

The operation of the foregoing system 1001 will be described with reference to a sequence shown in FIG. 4. Suppose here that the access signal transmitted from the reader/writer 3 to the wireless tag 2 is a signal for requesting data read (read request signal). An example of the case where such a signal is transmitted is when the reader/writer 3 reads data on user's identification information, billing information, or the like that is recorded on the wireless tag 2.

In the system 1001, the reader/writer control unit 32 of the reader/writer 3 transmits the read request signal (step S41). Receiving the signal, the decoding unit 25 of the wireless tag 2 performs decoding processing on the received signal.

The wireless tag control unit 23 recognizes the result of the decoding processing (step S42). Here, the result of decoding indicates that the signal transmitted from the reader/writer 3 is a read request signal. The wireless tag control unit 23 also acquires from the button depression detecting unit 22 the result of detection that indicates whether the button 21 is currently being depressed or not (step S43).

Figure 5:
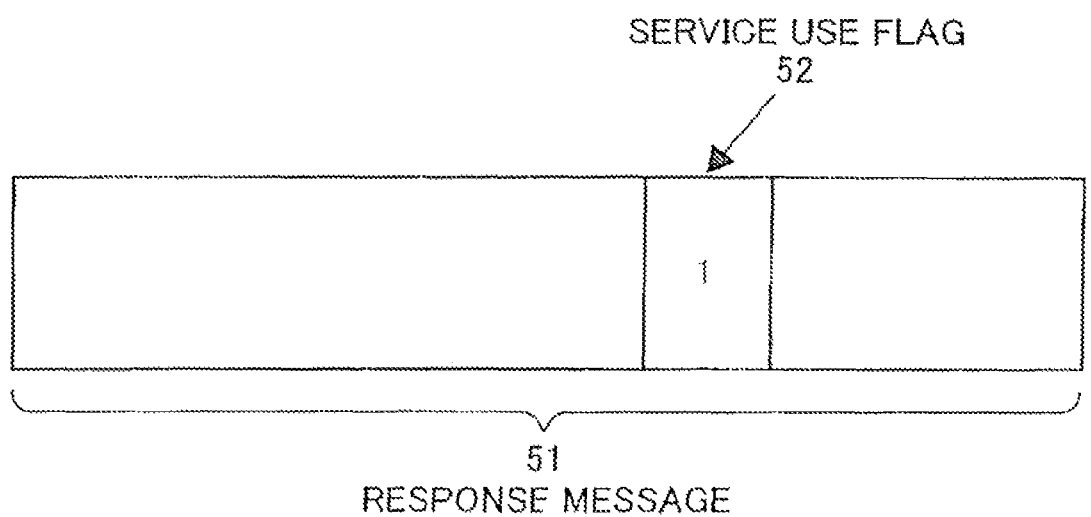
FIG. 5 is an explanatory diagram on a response message according to the first concrete example.

The wireless tag control unit 23 reads data specified by the read request signal from the memory 26 (step S44). The wireless tag control unit 23 then creates a response message that includes the read data and a service use flag (step S45). FIG. 5 shows an example of the response message. The response message 51 has a service use flag 52, which is set to a value that indicates the result of detection of the button depression detecting unit 22, i.e., whether the button 21 is being depressed or not. In the present example, the service use flag 52 is set to "1" when the button 21 is being depressed, and "0" when the button 21 is not being depressed.

The wireless tag control unit 23 notifies the response message (51) to the reader/writer 3 through the antenna (step S46).

Receiving the response message (51) through the antenna, the reader/writer control unit 32 activates a service AP 34 that corresponds to the service use flag (52) included in the message (step S47). For example, if the flag has a value of "0," i.e., the button 21 of the wireless tag 2 is not being depressed, the reader/writer control unit 32 activates a service AP 34 that performs an accounting service alone. If the button 21 is being depressed and the flag has a value of "1," the reader/writer control unit 32 activates a service AP 34 that performs a mailing service for sending a payment statement in addition to the accounting service.

Incidentally, when performing a mailing service for sending a payment statement, the reader/writer control unit 32 may make an inquiry about the mail address of the user. The data to be read from the memory 26 at the foregoing step S44 may include the user's mail address to save the trouble of inquiring the mail address of the user.

The foregoing operation is for situations where the access signal that the reader/writer 3 transmits to the wireless tag 2 is a read request signal. However, the access signal may be other types of signals. Even in such cases, a response message having contents corresponding to the combination of the result of decoding of the decoding unit 25 and the result of detection of the button depression detecting unit 22 is notified from the wireless tag 2 to the reader/writer 3.

The method of creating a response message is not limited to the above example.

For example, data may be read from different areas of the memory 26 depending on whether the button 21 is being depressed or not, and the read data may be put into a certain field of the response message.

According to the system 1001 described above, the wireless tag 2 sends back the response message corresponding to the operation status of the button 21 to the reader/writer 3 which has transmitted the access signal. The reader/writer 3 can thus activate a service AP 34 that reflects the user's current intention.

Concrete Example 2

Figure 6:
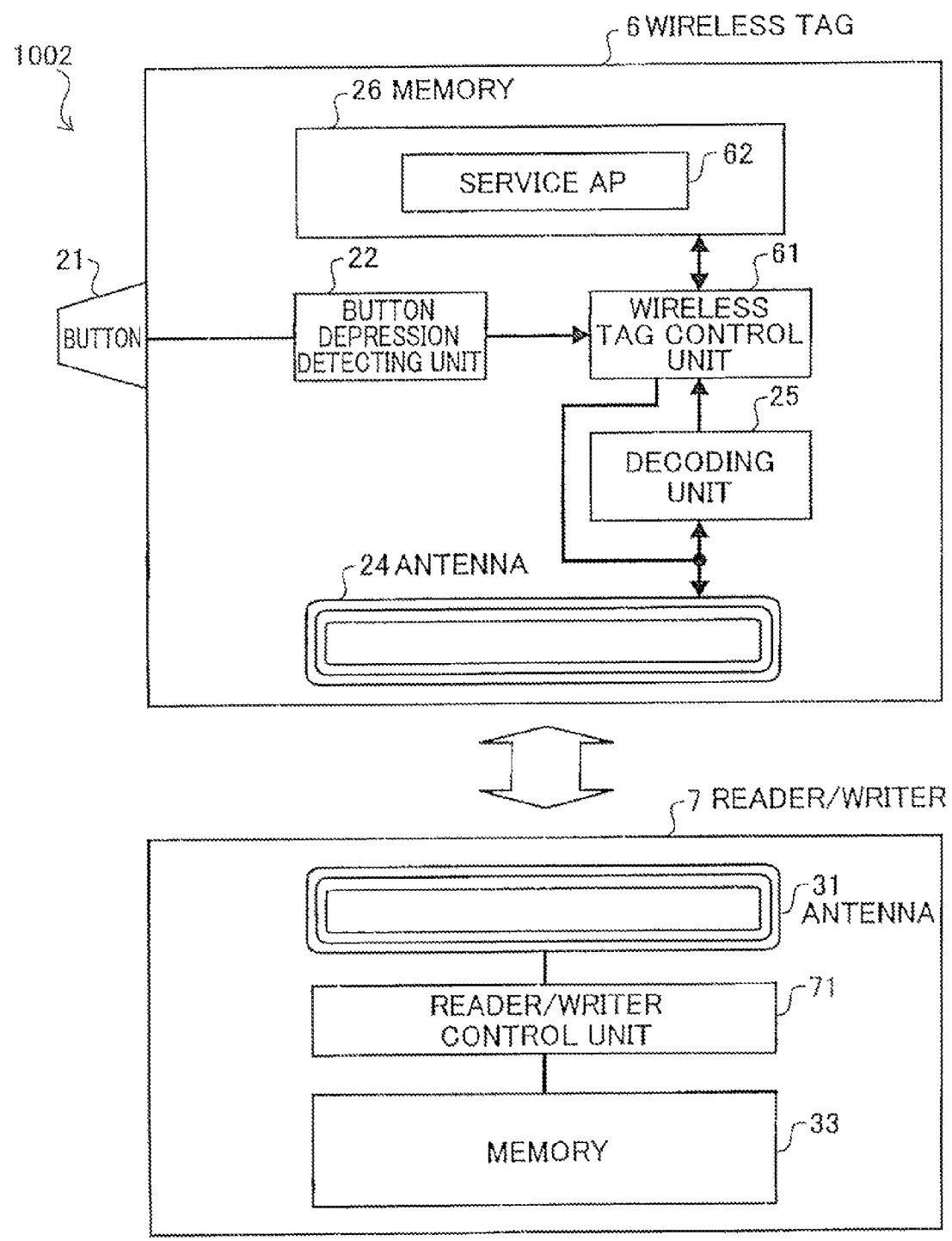
FIG. 6 is a block diagram of a second concrete example of the first embodiment.

FIG. 6 shows the configuration of a second concrete example according to the embodiment of FIG. 1. A system 1002 of the concrete example includes a wireless tag 6 and a reader/writer 7. The wireless tag 6 of this concrete example differs from the wireless tag 2 of the foregoing system 1001 (FIG. 3) in that a wireless tag control unit 61 is provided instead of the wireless tag control unit 23, and that the memory 26 contains a service AP 62.

The wireless tag control unit 61 exercises control whether or not to activate the service AP 62, depending on the combination of the result of decoding of the decoding unit 25 and the result of detection of the button depression detecting unit 22. The service AP 62 is a program to be additionally executed when the wireless tag 6 receives a write request from the reader/writer 7 to be described later.

Figure 7:
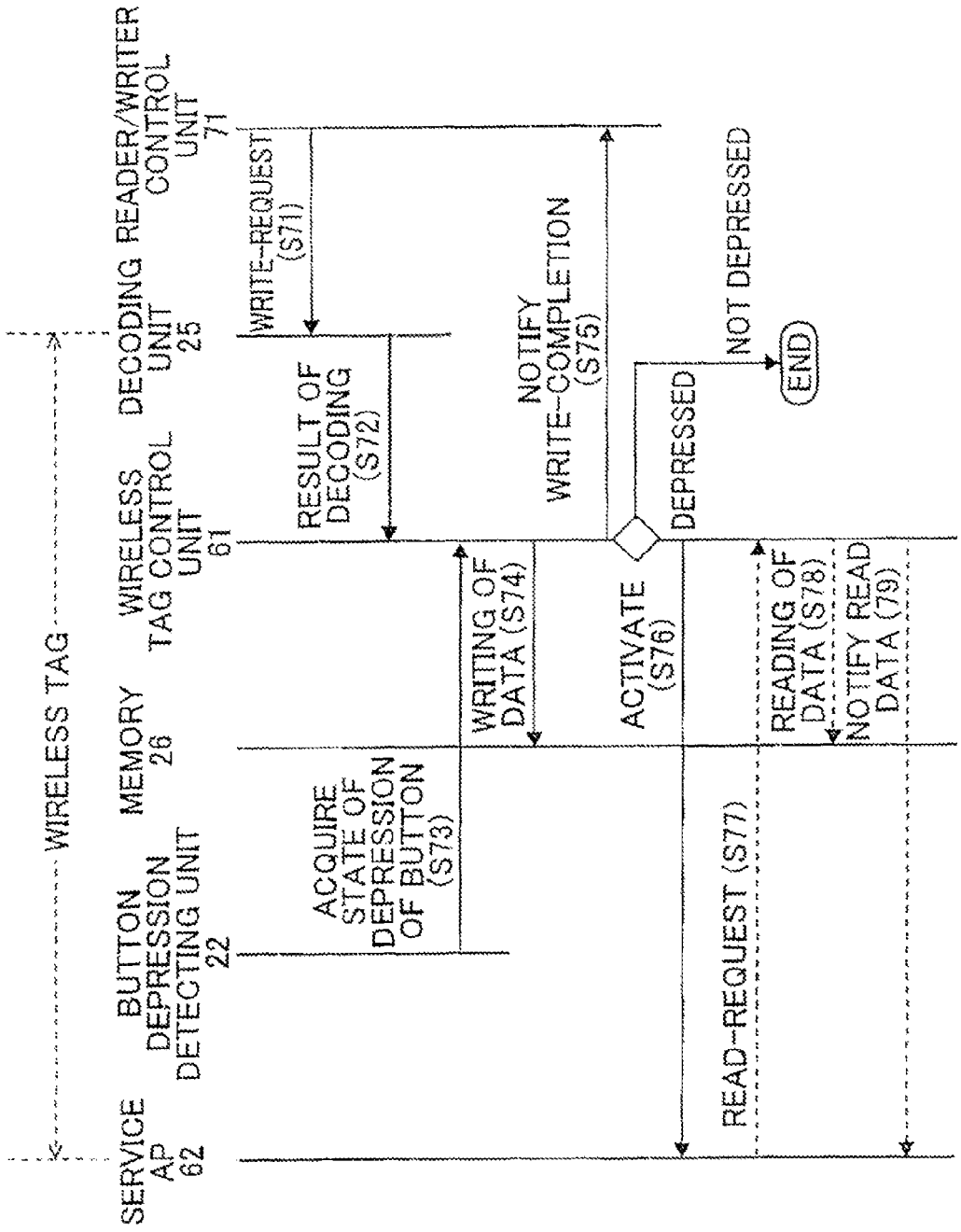
FIG. 7 is a sequence diagram of the second concrete example.

The operation of the foregoing system 1002 will be described with reference to a sequence shown in FIG. 7. Suppose here that the access signal transmitted from the reader/writer 7 to the wireless tag 6 is a signal for requesting data write (write request signal). An example of the case where such a signal is transmitted is when the reader/writer 7 writes user's new billing information to the wireless tag 6 in a place such as a shop or a station's ticket gate.

In the system 1002, the reader/writer control unit 71 of the reader/writer 7 transmits a read request signal (step S71). Receiving the signal, the decoding unit 25 of the wireless tag 6 performs decoding processing on the received signal.

The wireless tag control unit 61 recognizes the result of the decoding processing (step S72). Here, the result of decoding indicates that the signal transmitted from the reader/writer 3 is a write request signal. The wireless tag control unit 61 also acquires from the button depression detecting unit 22 the result of detection that indicates whether the button 21 is currently being depressed or not (step S73).

The wireless tag control unit 61 writes data included in the write request signal from the reader/writer 7 into the memory 26 (step S74), and then transmits a write completion notification to the reader/writer 7 (step S75).

The wireless tag control unit 61 judges the result of detection of the button depression detecting unit 22, i.e., judges the operation status of the button 21 upon the reception of the foregoing write request. If the button 21 is being depressed, the wireless tag control unit 61 activates the service AP 62 (step S76). If the button 21 is not being depressed, the service AP 62 is not activated.

For example, the service AP 62 may be a program that provides a screen display or voice output of the data that is written at step S74. In other examples, the service AP 62 may perform a route search, a station information search, etc. In such cases, the reader/writer 7 which serves as a station ticket gate may write billing information to the wireless tag 6 which has a ticket function. If the button 21 of the wireless tag 6 is being depressed, the wireless tag 6 executes the service AP 62 for route search or the like after the writing of the billing information.

The activated service AP 62 outputs a read request to the wireless tag control unit 61 if the data written at the foregoing step S74 is needed in providing the service to the user (step S77). Receiving the request, the wireless tag control unit 61 reads the corresponding data from the memory 26 (step S78), and supplies the data to the service AP 62 (step S79).

According to the system 1002 described above, it is possible to provide additional services such as a route search according to the user's current intention when the wireless tag 6 receives the access signal from the reader/writer 7.

Concrete Example 3

FIG. 8 shows the configuration of a third concrete example according to the embodiment of FIG. 1. A system 1003 of the concrete example includes a wireless tag 8 and a reader/writer 3. The reader/writer 3 is the same as that of the foregoing system 1001 (FIG. 3). The wireless tag 8 of this concrete example includes a plurality of buttons 21-1 to 21-$n$ and a plurality of button depression detecting units 22-1 to 22-$n$.

The buttons 21-1 to 21-$n$ and the button depression detecting units 22-1 to 22-$n$ have the same functions as those of the button 21 and the button depression detecting unit 22 of the system 1001, respectively. A wireless tag control unit 81 creates a response message having contents corresponding to a combination of the result of decoding of the decoding unit 25 and the results of detection of the button depression detecting units 22-1 to 22-$n$ about the buttons 21-1 to 21-$n$, and sends back the response message to the reader/writer 3.

Figure 9:
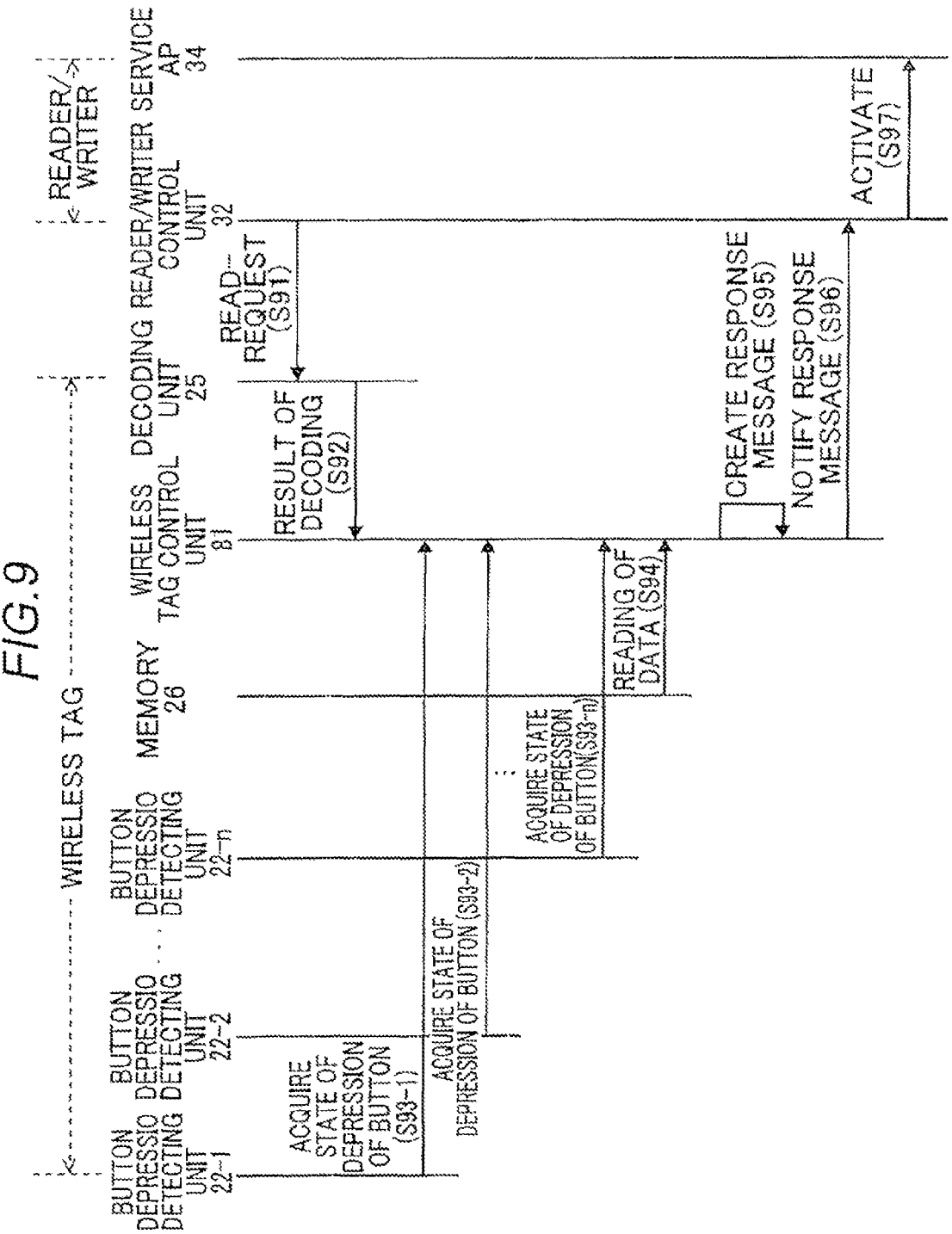
FIG. 9 is a sequence diagram of the third concrete example.

The operation of the foregoing system 1003 will be described with reference to a sequence shown in FIG. 9. Suppose here that the access signal transmitted from the reader/writer 3 to the wireless tag 8 is a data read request signal as in the operation of the foregoing system 1001 (FIG. 4).

In the system 1003, the reader/writer control unit 32 of the reader/writer 3 transmits the read request signal (step S91). Receiving the signal, the decoding unit 25 of the wireless tag 8 performs decoding processing on the received signal.

The wireless tag control unit 81 recognizes the result of the decoding processing (step S92). The wireless tag control unit 81 also acquires from the button depression detecting units 22-1 to 22-*n* the results of detection whether the respective buttons 21-1 to 21-*n* are being depressed or not (steps S93-1 to S93-*n*). The wireless tag control unit 81 thereby judges which of the buttons 21-1 to 21-*n* is/are being depressed.

Figure 10:
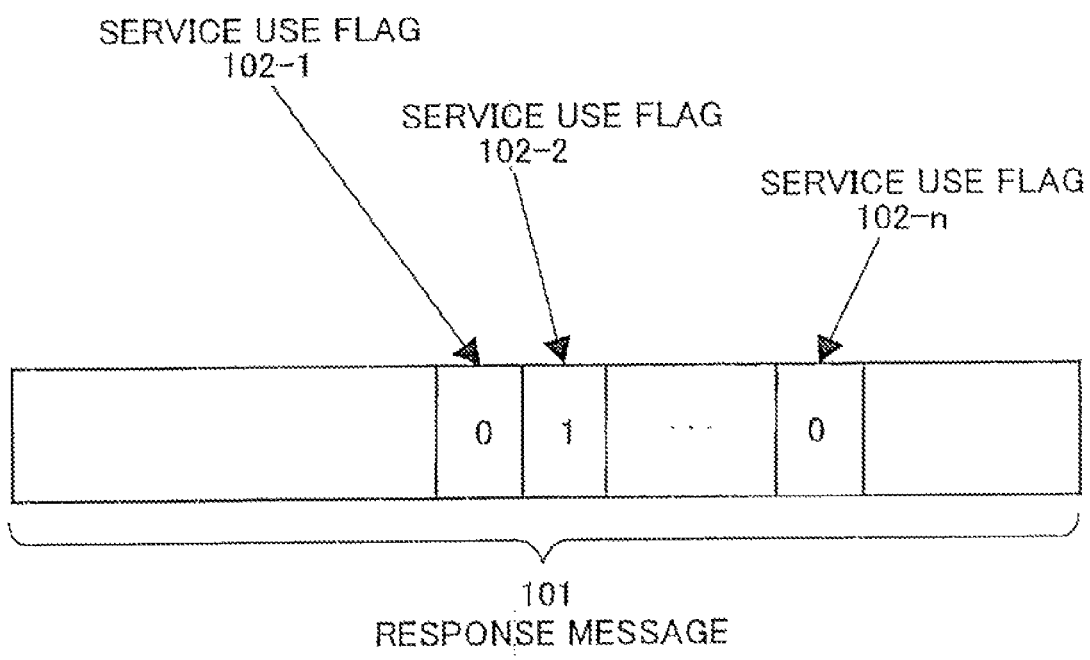
FIG. 10 is an explanatory diagram on a response message according to the third concrete example.

The wireless tag control unit 81 reads data specified by the read request signal from the memory 26 (step S94). The wireless tag control unit 81 then creates a response message that includes the read data and service use flags (step S95). FIG. 10 shows an example of the response message. The response message 101 includes service use flags 102-1 to 102-*n* corresponding to the results of detection of the respective button depression detecting units 22-1 to 22-*n*. Specifically, the service use flags are set to "1" or "0" depending on whether the buttons are being depressed or not, as with the foregoing response message 51 (FIG. 5).

The wireless tag control unit 23 notifies the response message (101) to the reader/writer 3 through the antenna (step S96).

The reader/writer control unit 32 receives the response message (101) through the antenna, and activates a service AP 34 corresponding to the service use flags (102-1 to 102-*n*) included in the message (step S47). If a plurality of buttons are depressed on the wireless tag 8, the reader/writer control unit 32 activates the services AP 34 of the corresponding plurality of services.

According to the system 1003 described above, the user can easily specify a desired service from among a plurality of services. When the user currently desires a plurality of services, he/she can notify the reader/writer 3 of the services at the same time.

Concrete Example 4

Figure 11:
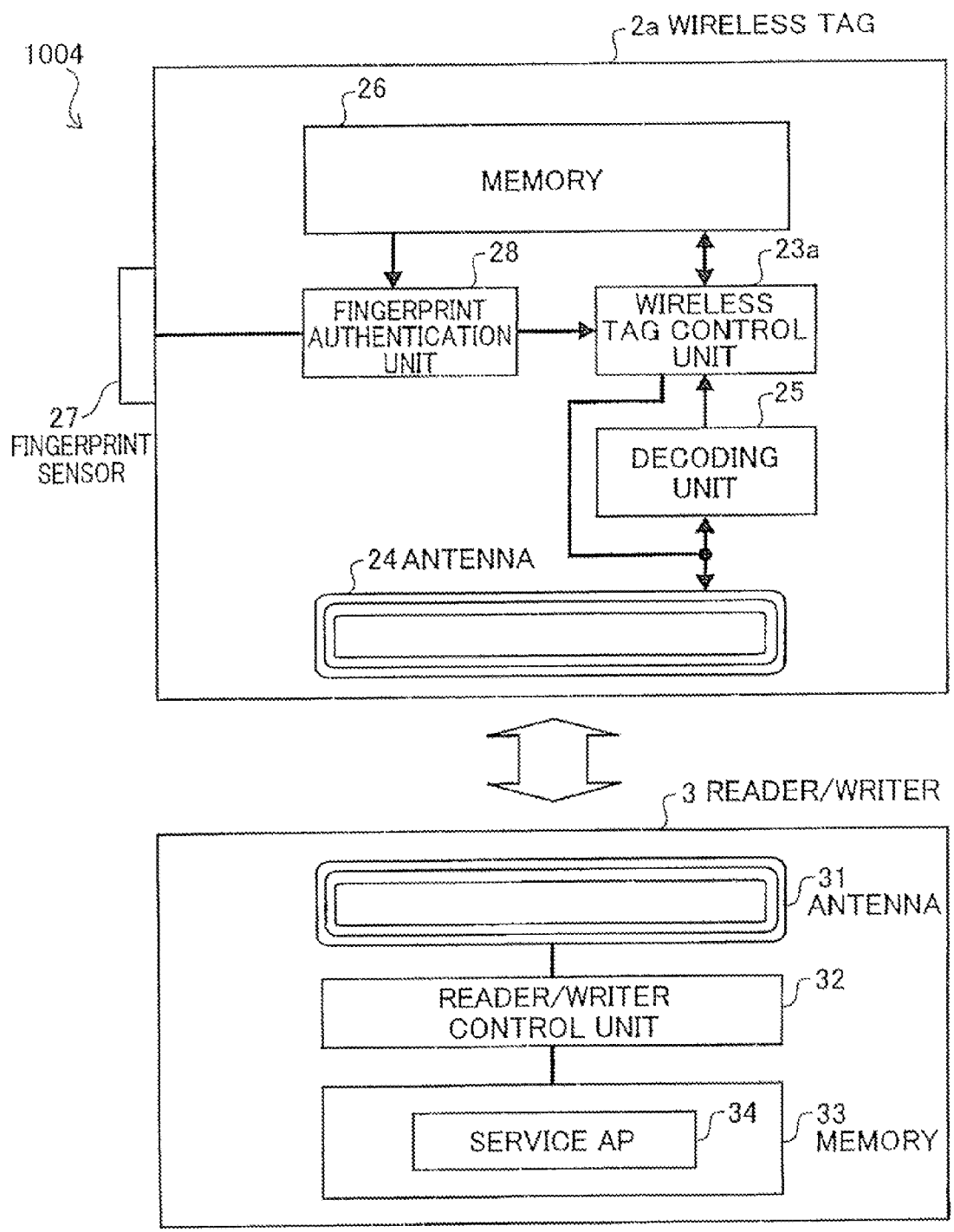
FIG. 11 is a block diagram of a fourth concrete example of the first embodiment.

FIG. 11 shows the configuration of a fourth concrete example according to the embodiment of FIG. 1. A system 1004 of the concrete example includes a wireless tag 2*a* and a reader/writer 3. The reader/writer 3 is the same as that of the foregoing system 1001 (FIG. 3). The wireless tag 2*a* of this concrete example differs from the wireless tag 2 of the system 1001 in that a fingerprint sensor 27 is provided instead of the button 21, and that a fingerprint authentication unit 28 is provided instead of the button depression detecting unit 22.

The fingerprint sensor 27 acquires fingerprint information on a finger that touches its sensor surface, and inputs the fingerprint information as a signal corresponding to a user operation. The fingerprint authentication unit 28 performs fingerprint authentication to determine the authenticity of the user by comparing the fingerprint information input by the fingerprint sensor 27 and the user's fingerprint information which has previously been registered in the memory 26.

A wireless tag control unit 23*a* notifies the reader/writer 3 of a response message that has contents corresponding to the combination of the result of decoding of the decoding unit 25 and the result of authentication of the fingerprint authentication unit 28.

Figure 12:
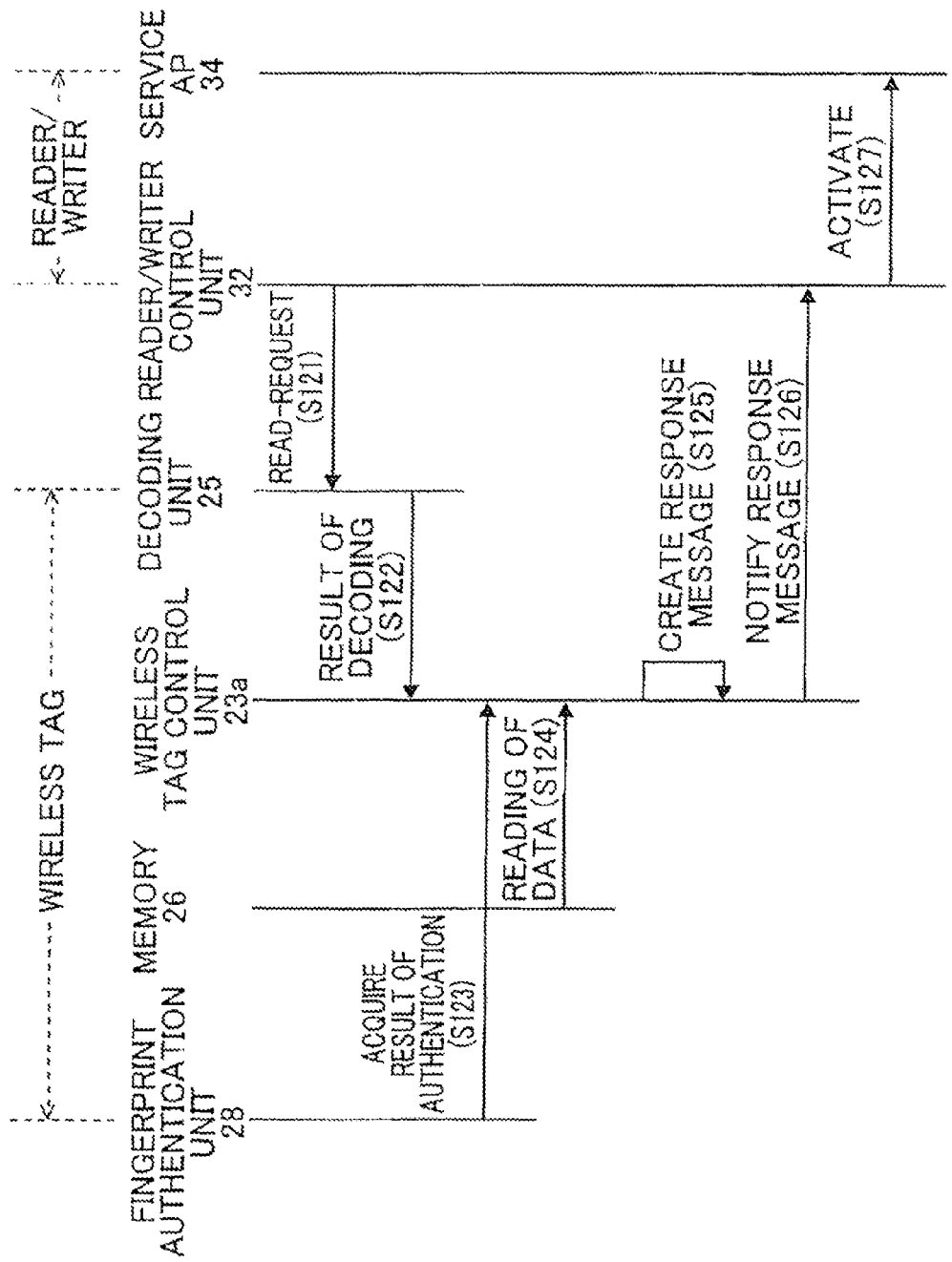
FIG. 12 is a sequence diagram of the fourth concrete example.

The operation of the foregoing system 1004 will be described with reference to the sequence of FIG. 12. The operation conforms to that of the foregoing system 1001 (FIG. 4). A difference between the operation of this concrete example and that of the system 1001 lies in that the result of authentication on a fingerprint is acquired from the fingerprint authentication unit 28 (step S123) instead of the status of depression of the button being acquired from the button depression detecting unit 22 (step S43).

The wireless tag control unit 23*a* creates a response message that includes data read from the memory 26 and a service use flag corresponding to the result of fingerprint authentication (step S125). The flag is set to "1" if the fingerprint authentication succeeds, and "0" if the authentication fails, for example. The rest of the processing of the system 1004 (S121, S122, S126, and S127) is the same as that of the foregoing system 1001 (S41, S42, S46, and S47).

While the foregoing operation of the system 1004 is in conformity to that of the system 1001, it may conform to that of the system 1002 (FIG. 7) instead. In such a case, the acquisition of the status of button depression in the system 1001 (S43) may be replaced with the acquisition of the result of fingerprint authentication (S123).

According to the system 1004 described above, it is possible to impose such a limitation that services be available only if the user who is using the wireless tag 2 is an authentic user.

Second Embodiment

Figure 13:
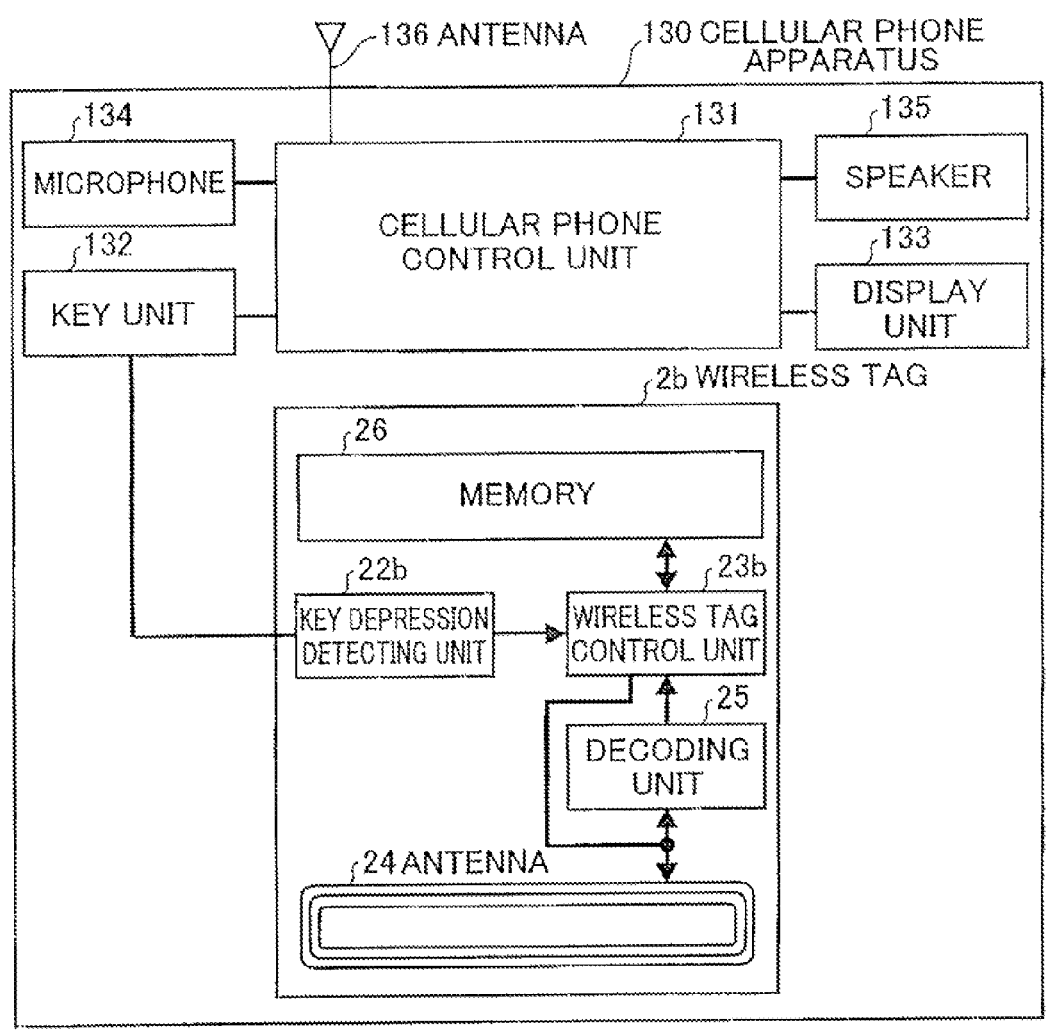
FIG. 13 is a block diagram showing an example of configuration of a second embodiment according to the present invention.

FIG. 13 shows the configuration of an embodiment of the communication apparatus according to the present invention. The present embodiment is a cellular phone apparatus 130 that incorporates a wireless tag 2*b*. The cellular phone apparatus 130 includes a cellular phone control unit 131 for call control, a key unit 132 such as a numeric keypad and a call key, a display unit 133 such as an LCD, a microphone 134, a speaker 135, an antenna 136, and the wireless tag 2*b*.

The wireless tag 2*b* conforms to the wireless tag 2 (FIG. 3) according to the concrete example of the foregoing first embodiment, but without the button 21. The wireless tag 2*b* also differs from the wireless tag 2 in that a key depression detecting unit 22*b* is provided instead of the button depression detecting unit 22, and that the button depression detecting unit 22*b* detects user operations on the key unit 132.

The key depression detecting unit 22*b* functions as a detecting unit, and detects whether a certain key on the key unit 132 of the cellular phone apparatus 130 is being depressed or not. A wireless tag control unit 23*b* performs processing corresponding to the combination of the result of decoding of the decoding unit 25 and the result of detection of the key depression detecting unit 22*b*.

In operation, the wireless tag 2*b* of the present embodiment differs from the foregoing wireless tag 2 in that the key depression detecting unit 22*b* detects the operation status of the key unit 132 of the cellular phone apparatus 130 instead of the button depression detecting unit 22 detecting the operation status of the button 21.

While the wireless tag 2*b* of the present embodiment is configured in conformity to the wireless tag 2, it may instead be configured in conformity to the wireless tag 6 shown in FIG. 6 or the wireless tag 8 shown in FIG. 8. Even in such cases, the wireless tag 2*b* does not include the button 21 or the buttons 21-1 to 21-*n*, and detects the operation status of the key unit 132 with the key depression detecting unit 22*b*.

Such a wireless tag 2*a* as shown in FIG. 11 may be incorporated into a cellular phone apparatus that has a fingerprint sensor. In such a case, the wireless tag does not include the fingerprint sensor 27, and the fingerprint authentication unit 28 receives fingerprint data from the fingerprint sensor of the cellular phone apparatus.

According to the present embodiment, the wireless tag according to the present invention can be incorporated into a cellular phone apparatus 130 which the user carries about everyday. This makes it possible to provide the user of the cellular phone apparatus 130 with not only cellular phone services but also various types of services that use the wireless tag.

Third Embodiment

Figure 14:
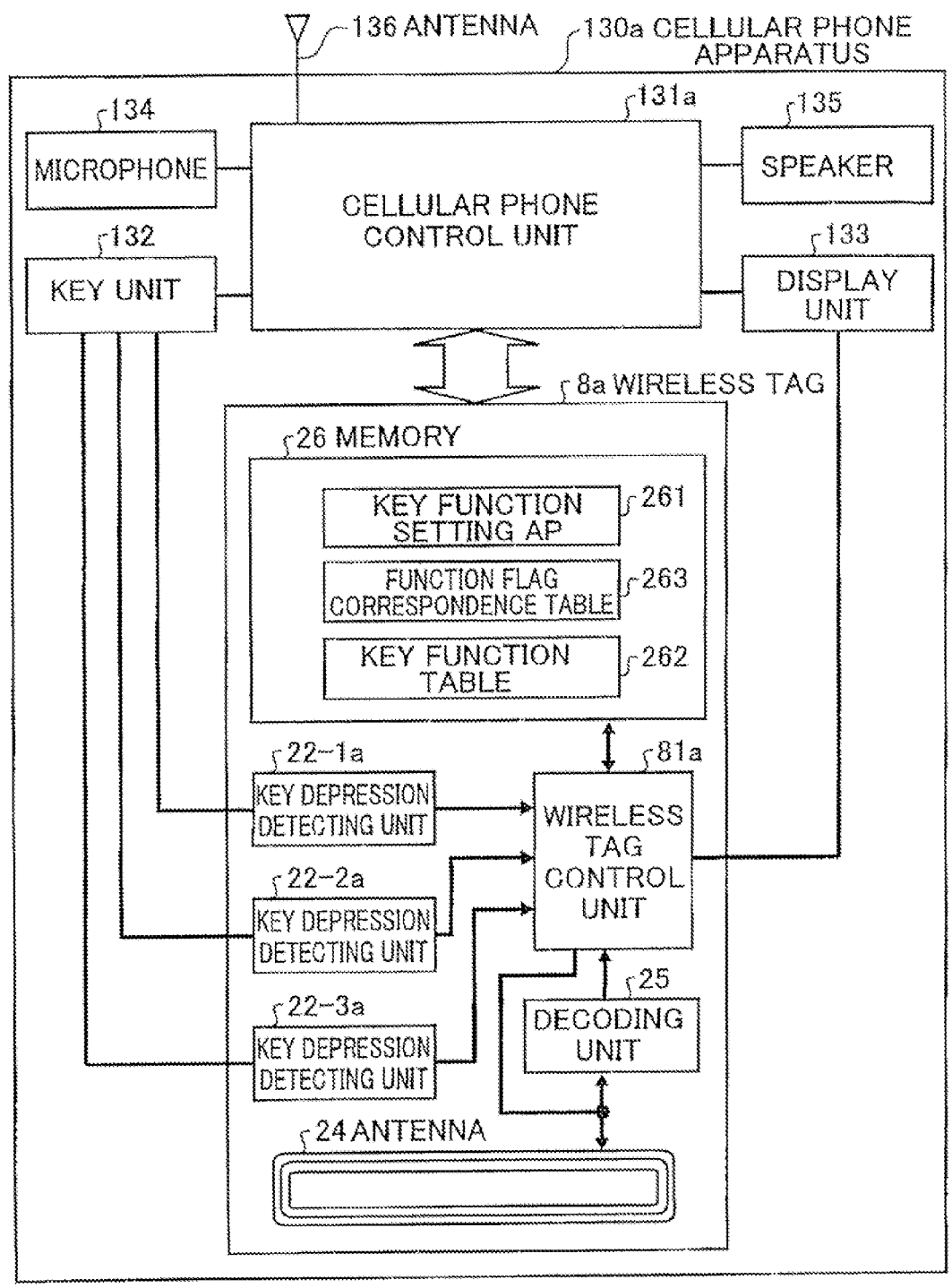
FIG. 14 is a block diagram showing an example of configuration of a third embodiment according to the present invention.

FIG. 14 shows the configuration of another embodiment of the communication apparatus according to the present invention. In the present embodiment, a cellular phone apparatus (130a) including a wireless tag (8a) is configured so that the user can set the functions to be assigned to the keys.

The cellular phone apparatus 130a of the present embodiment differs from the foregoing cellular phone apparatus 130 (FIG. 13) in that the wireless tag 8a is provided instead of the wireless tag 2b. The wireless tag 8a conforms to the wireless tag 8 of the foregoing system 1003 (FIG. 8), but without the buttons 21-1 to 21-n.

Key depression detecting units 22-1a to 22-3a of the wireless tag 8a are assigned with respective different keys of the key unit 132. The key depression detecting units 22-1a to 22-3a detect the operation statuses of their respective assigned keys. The memory 26 of the cellular phone apparatus 130a contains a key function setting AP 261, a key function table 262, and a function flag correspondence table 263.

The key function setting AP 261 is an application program for registering the correspondence between user operations on the key unit 132 and additional service functions into the key function table 262.

FIG. 15 shows an example of configuration of the function flag correspondence table 263. The function flag correspondence table 263 contains additional service functions and flag values for each service type.

Figure 16:
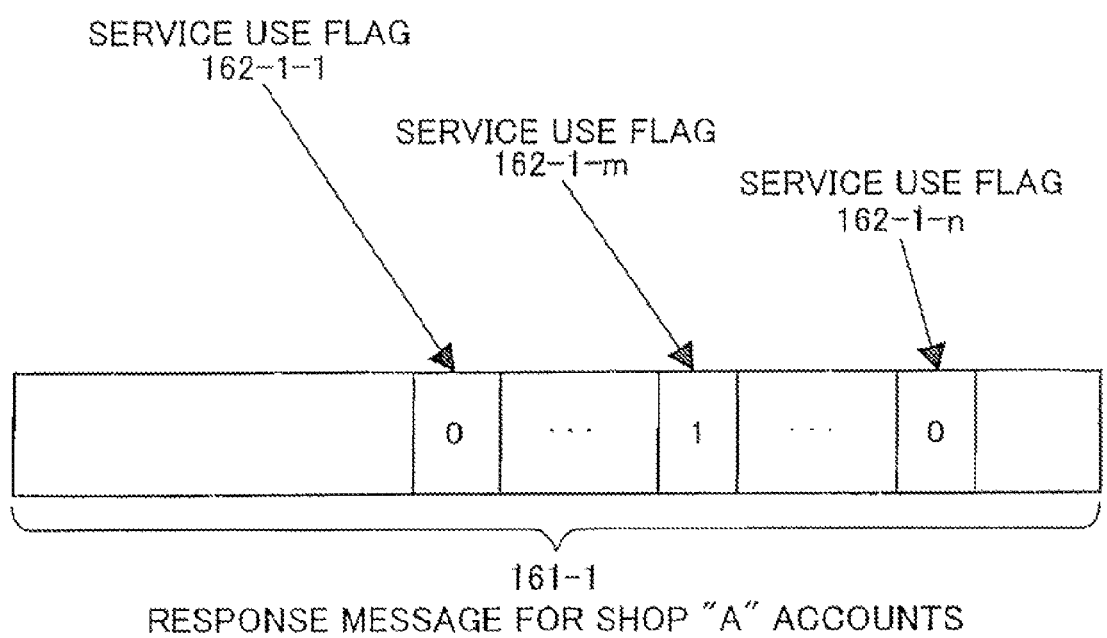
FIG. 16 is an explanatory diagram of a response message according to the third embodiment.

FIG. 16 shows an example of a response message for the cellular phone apparatus 130a to notify to a reader/writer. The shown example is a response message 161-1 to be notified from the wireless tag 8a of the cellular phone apparatus 130a to the reader/writer in a shop A upon checking out of the shop A. The response message 161-1 includes all service use flags 162-1-1 to 162-1-n that are registered for "shop A checkout" in the function flag correspondence table 263 of FIG. 15. In the case of services pertaining to a mobile ticket, service use flags 162-2-1 to 162-2-k will be included in the response message.

FIG. 17 shows an example of configuration of the key function table 262. The shown table contains function assignments to "key 1;" "key 2," and "key 3" of the key unit 132 for each of service types "shop A checkout" and "motile ticket." For example, when the service "shop A checkout" is used, the wireless tag 8a performs checkout processing alone if none of the keys is depressed. The depression of the "key 1" in "shop A checkout" indicates that the user desires a mailing service for sending a payment statement in addition to the checkout processing.

For "mobile ticket," the key function table 262 is handled in the same way. For example, if two keys "key 1" and "key 3" are depressed in "mobile ticket," it indicates that the user desires both a "route search" and a "spot recommendation" in addition to ticket billing processing.

To assign additional service functions to the key unit 132, the user initially instructs the wireless tag 8a from the key unit 132 to activate the key function setting AP 261. The wireless tag control unit 81a executes the key function setting AP 261 instructed, and displays on the display unit 133 a GUI for assigning additional service functions to certain keys of the key unit 132. Using the GUI displayed, the user assigns additional functions to the certain keys.

For example, the foregoing GUI may display key alternatives with respect to combinations of functions and service types to which the functions belong. The wireless tag control unit 81a then registers the user's assignment into the key function table 262 in such a form as shown in FIG. 17.

Figure 18:
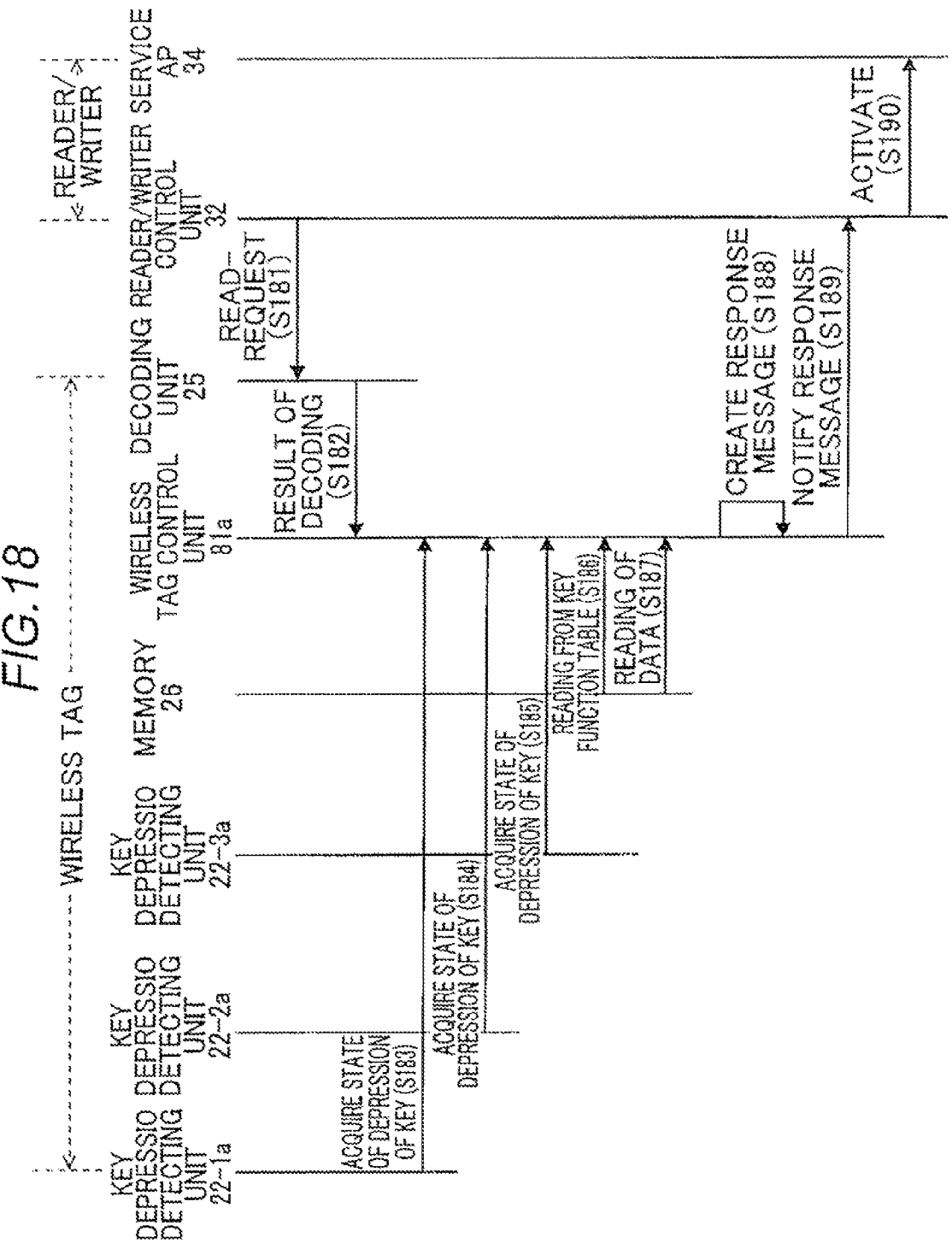
FIG. 18 is a sequence diagram of the third embodiment.

The operation of the present embodiment will be described with reference to a sequence shown in FIG. 18. Suppose, for the sake of convenience, that the reader/writer 3 of FIG. 3 transmits a read request to the cellular phone apparatus 130a.

The reader/writer control unit 32 of the reader/writer 3 sends a read request signal as the access signal to the wireless tag 8a of the cellular phone apparatus 130a (step S181). The read request signal shall include information that indicates "shop A checkout" which is the service to be provided to the user.

Receiving the foregoing read request signal, the wireless tag 8a decodes the signal by using the decoding unit 25. From the result of decoding, the wireless tag control unit 81a recognizes that the received signal is a read request signal and the service type is "shop A checkout" (step S182). The wireless tag control unit 81a acquires the results of detection about the operation status of the key unit 132 from the key depression detecting units 22-1a to 22-3a (steps S183 to S185).

Using the combination of the foregoing result of decoding and the results of detection of the key depression detecting units 22-1a to 22-3a, the wireless tag control unit 81a reads the corresponding information from the key function table 262 and the function flag correspondence table 263 (step S186). The wireless tag control unit 81a thereby determines the values of the service use flags to be included in the response message for the reader/writer 3.

For example, if the results of detection of the key depression detecting parts 22-1a to 22-3a indicate the depression of the "key 1" alone, the wireless tag control unit 81a recognizes from the table 262 of FIG. 17 that the user-desired additional function is the "mailing of payment statement." Next, from the table 263 of FIG. 15, the wireless tag control unit 81a identifies the "service use flag 162-1-m" of the "mailing of payment statement" in the records of the "shop A checkout."Consequently, as shown in FIG. 16, the wireless tag control unit 81a sets the service use flags of the response message 161-1 so that only the service use flag 162-1-m is "1" and the others are "0."

The wireless tag control unit 81a reads from the memory 26 the data that is specified by the read request from the reader/writer 3 (step S187). The wireless tag control unit 81a then creates a response message that includes the read data and the values of the service use flags determined as described above (step S188), and notifies the created response message to the reader/writer 3 (step S189).

When the response message from the cellular phone apparatus 130a reaches the reader/writer 3, the reader/writer control unit 32 activates services AP 34 that correspond to the service use flags included in the message (step S190). For example, when receiving the response message 161-1 of FIG. 16, the reader/writer control unit 32 recognizes that the service use flag 162-1-m is "1." The reader/writer control unit 32 then activates a service AP 34 for performing the mailing service for sending a payment statement in addition to the checkout processing of the shop A.

According to the present embodiment, the user can arbitrarily assign additional service functions to the key unit 132 by using the key function setting AP 261.

Fourth Embodiment

Figure 19:
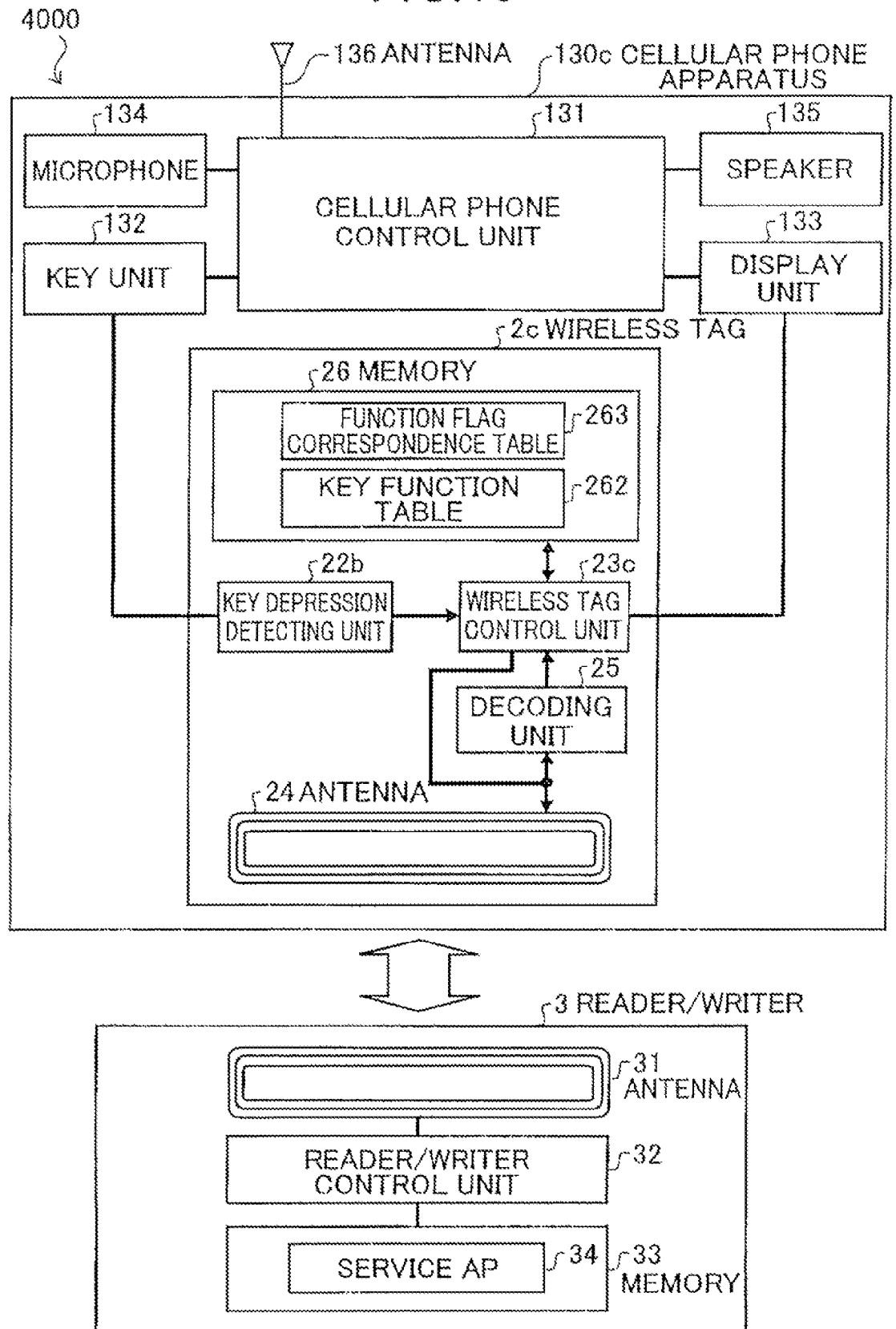
FIG. 19 is a block diagram showing an example of configuration of a fourth embodiment according to the present invention.

FIG. 19 shows the configuration of an embodiment of the system according to the present invention. In the present embodiment, the wireless tag which is incorporated in a cellular phone apparatus is configured so that the keys and additional service functions can be associated from a reader/writer.

The wireless tag 2c included in the cellular phone apparatus 130c of the system 4000 differs from the foregoing wireless tag 2b (FIG. 13) in that the wireless tag 2c does not include the key function setting AP 261.

When receiving a key function setting request signal as the access signal from the reader/writer 3, the wireless tag 2c registers key assignment information corresponding to the request into the key function table 262 by using a wireless tag control unit 23c. The wireless tag 2c also has the function of displaying the contents of registration, i.e., the keys and the key-assigned functions on the display unit 133.

Figure 20:
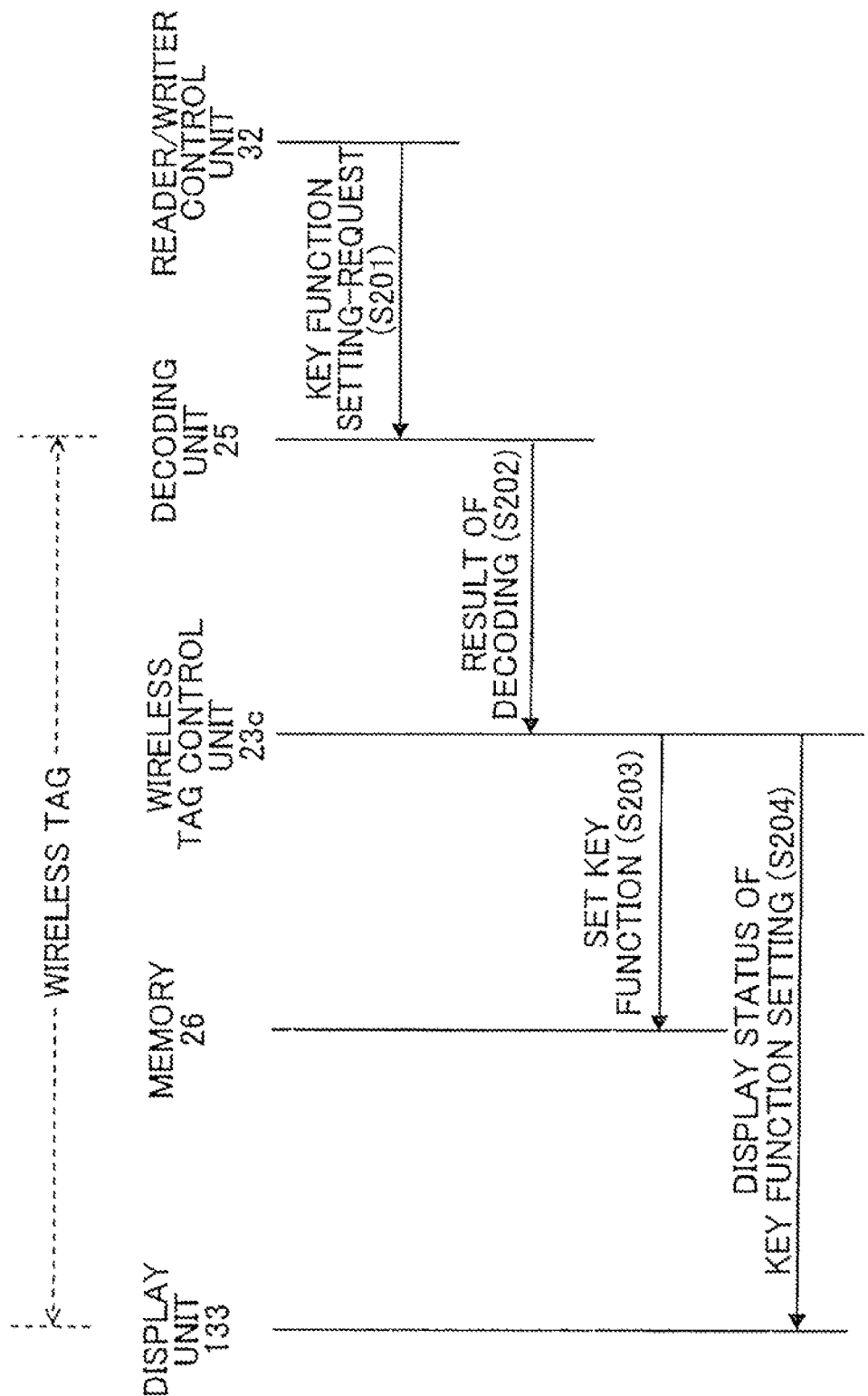
FIG. 20 is a sequence diagram of the fourth embodiment.

The operation of the foregoing system 4000 will be described with reference to a sequence shown in FIG. 20. Suppose that the reader/writer control unit 32 transmits a key function setting request signal as the access signal to the cellular phone apparatus 130c (step S201).

Figure 21:
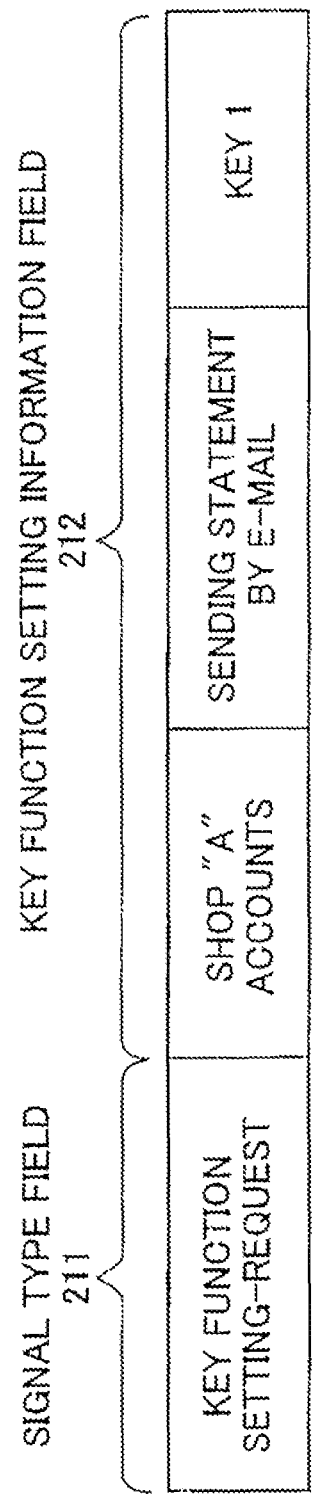
FIG. 21 is an explanatory diagram of a key function setting request signal according to the fourth embodiment.

FIG. 21 shows an example of configuration of the key function setting request signal. The shown key function setting request signal includes a signal type field 211 which describes information that indicates that the signal is a key function setting request signal. The remaining key function setting information field 212 describes information on the service type, the additional service function, and the key for the function to be assigned to. The key function setting information field 212 shown in the diagram indicates that the additional function "mailing of statement" with the service type "shop A checkout" is to be assigned to the "key 1."

When the foregoing key function setting request signal reaches the wireless tag 8c, the decoding unit 25 decodes the signal. The wireless tag control unit 23c recognizes the result of decoding (step S202), and registers the contents of the key function setting information field (212) of the recognized key function setting request into the key function table 262 (step S203). The wireless tag control unit 23 displays the contents of registration on the display unit 133 (step S204).

Figure 22:
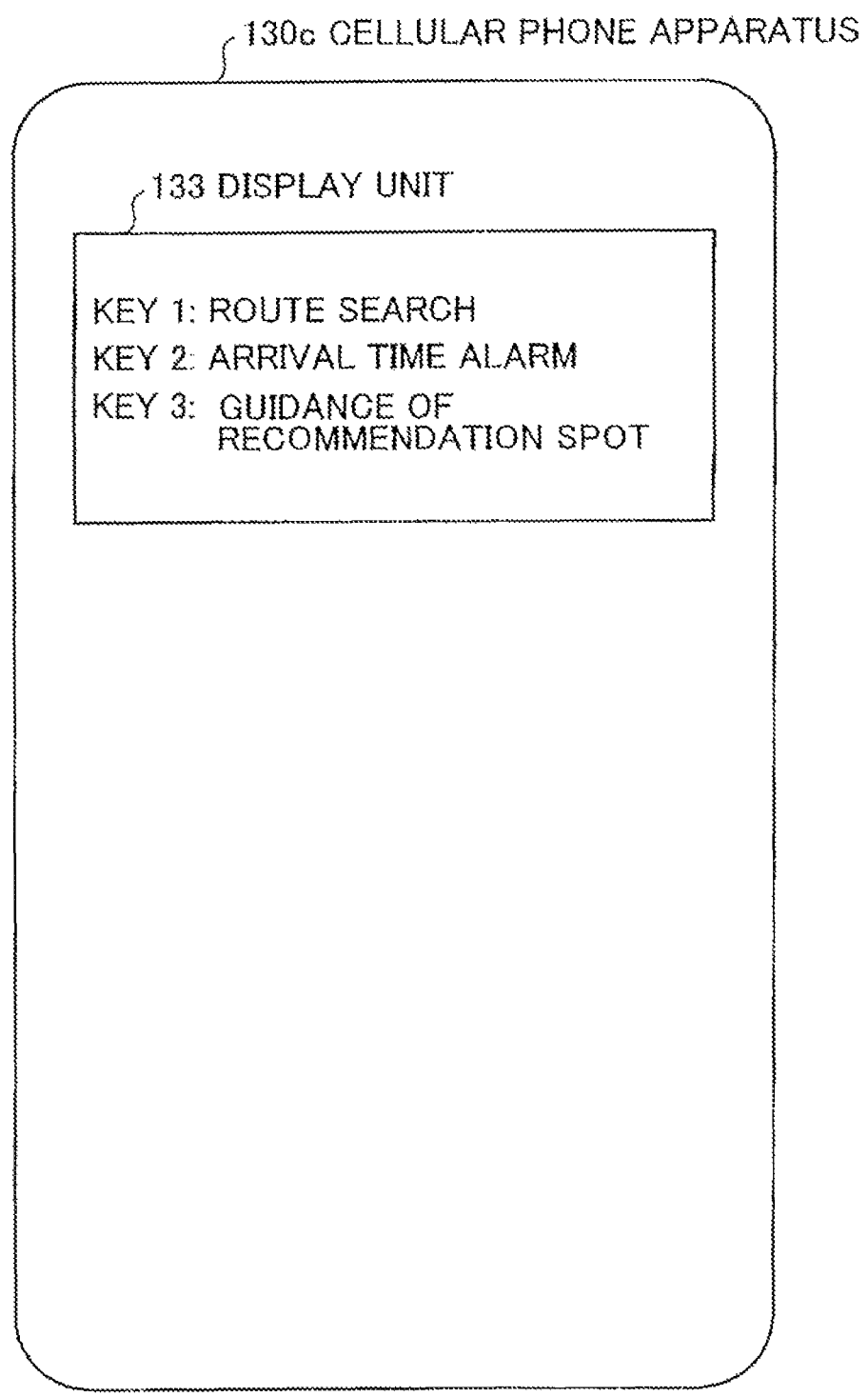
FIG. 22 is an explanatory diagram on a display for key setting according to the fourth embodiment.

FIG. 22 shows the state where the contents of registration in the key function table 262 are displayed on-screen on the display unit 133 of the cellular phone apparatus 130c. The user who browses the screen can check that the additional functions "route search," "arrival time alarm," and "spot recommendation" are assigned to the "key 1," "key 2," and "key 3," respectively.

According to the present embodiment, the user can register the key assignment of additional service functions into the wireless tag 8c by simply holding the cellular phone apparatus 130c over the reader/writer 3.

The embodiments of the present invention are not limited to the foregoing, and various modifications may be made within the scope of the claims of this application. For example, the present invention may be practiced as a computer program to be executed by a wireless tag or a reader/writer, or as a recording medium storing the program.

When the wireless tag is incorporated in a communication apparatus such as a cellular phone apparatus, application programs implemented in the cellular phone apparatus may be used as the service APs to be executed by the wireless tag. The service APs need not necessarily be implemented within a wireless tag, within a reader/writer, or within a cellular phone apparatus, and may be set up on other servers through a network.

When the wireless tag has a plurality of input devices such as buttons, the priorities of the respective buttons may be determined and the settings may be registered in the memory in advance. In such a case, it is possible to exercise control so as to provide only a service that corresponds to the button of the highest priority among a plurality of buttons depressed. Here, the flags in the response message for the reader/writer are set so that the service use flag corresponding to the button of the highest priority is "1" and the other service use flags are "0."

The invention claimed is:

1. A system comprising a reader/writer and a wireless tag:
said reader/writer comprising:
  a reader/writer side antenna configured to send an access signal to said wireless tag and receive a response message to said access signal from said wireless tag; and
  a memory configured to store a plurality of application programs which are launched in response to said response message to said access signal;
said wireless tag comprising:
  a wireless tag side antenna configured to receive the access signal which has been sent from said reader/writer and send a response message to said received access signal to said reader/writer;
  a decoder configured to decode the access signal received by said wireless tag side antenna;
  a plurality of detectors configured to detect inputs of one or more user operation signals corresponding to an operation performed by a user and
  a controller configured to select at least one application program from the plurality of application programs corresponding to a combination of said decoded access signal and the one or more user operation signals generated by the operation performed by the user when receiving said access signal, generate a response message including information for launching said selected application program, and output the generated response message to said wireless tag side antenna;
wherein said memory included within said reader/writer stores the plurality of application programs which are respectively launched in response to at least two patterns of response messages among a plurality of patterns of response messages which are output in response to the same access signal.

2. The system according to claim 1,
wherein said plurality of application programs stored within said memory of said reader/writer includes a first application program which executes a process by being launched and a second application program which executes an additional process in addition to the process by being launched; and
wherein said controller generates one of a response message including information for launching said first application and a response message including information for launching said first and second applications in response to a combination of the decoded access signal and the user operation signal acquired when receiving said access signal, and send the response message to said reader/writer.

* * * * *